Patented Sept. 20, 1949

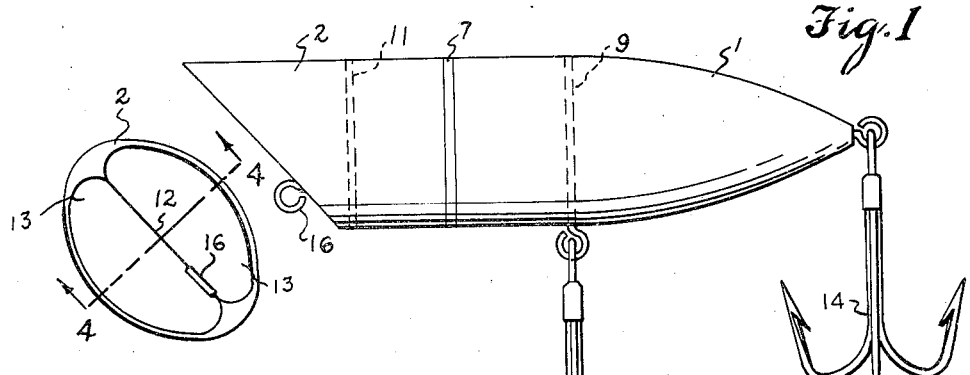
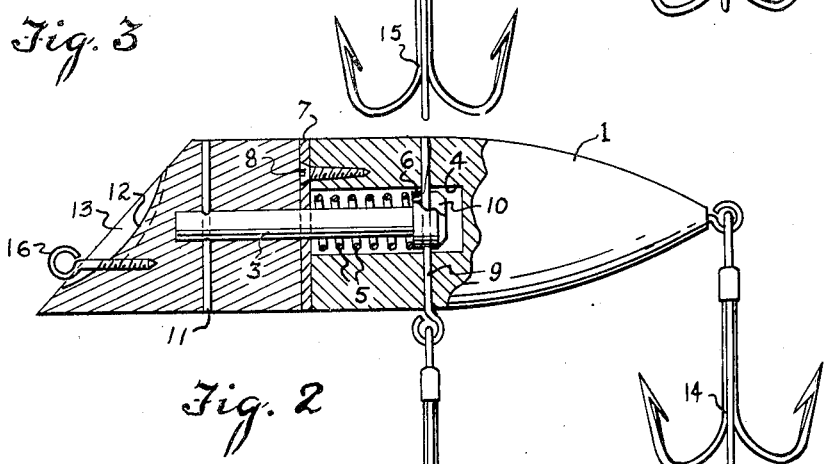
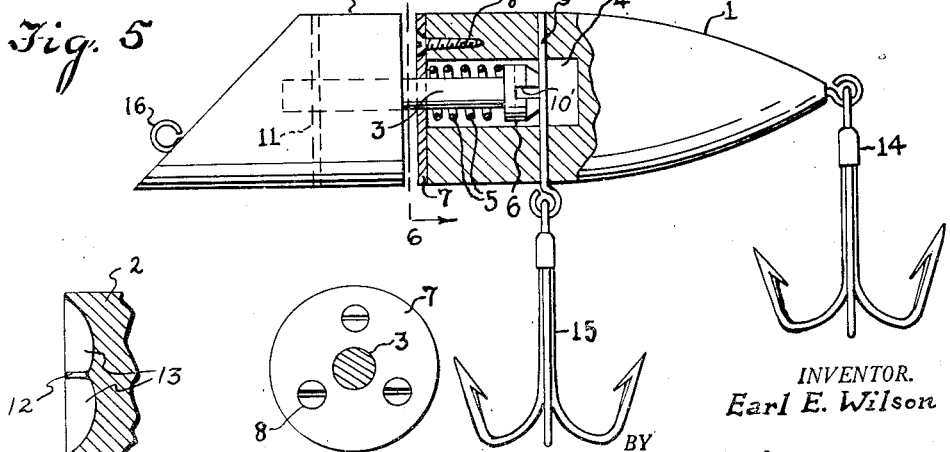

2,482,309

UNITED STATES PATENT OFFICE 2,482,309

ARTIFICIAL FISH LURE

Earl E. Wilson, Detroit, Mich.

Application September 11, 1945, Serial No. 615,617

6 Claims. (Cl. 43—42.22)

This invention relates to artificial fish lures and particularly lures having a front face inclined to the lure axis and formed on a head rotatively adjustable to adapt said face to impose either an upward or downward deflection on the lure as it is drawn through water.

An object of the invention is to provide in an improved and simplified manner for adapting the deflector head of a lure to be rotatively mounted on the lure body and securely held in its positions of differential deflection.

Another object is to form the inclined front face of a lure in a manner imparting a novel wabbling movement to the lure as it is drawn through the water.

These and various other objects are attained by the construction hereinafter described and illustrated in the accompanying drawing, wherein:

Fig. 1 is a side elevational view of my improved lure, showing the head thereof adjusted to deflect the lure toward the surface of water.

Fig. 2 is an axial sectional view of the lure showing its head adjusted to deflect the lure downwardly.

Fig. 3 is a view of the deflecting face of the lure as viewed transversely to said face.

Fig. 4 is a fragmentary cross sectional view of the head of the lure taken on the line 4—4 of Fig. 3.

Fig. 5 is a view similar to Fig. 2, but illustrating a slight modification and showing a separated relation of the lure head and body.

Fig. 6 is a cross section taken on the line 6—6 of Fig. 5.

In these views, the reference character 1 designates the body of a lure and 2 a head rotatively adjusted on said body. The head is cylindrical and preferably materially shorter than the body and has its front face materially inclined to the lure axis, preferably at about a forty-five degree angle. The head and body are formed of any suitable water-buoyant material such as wood, and the body is reduced progressively in diameter toward its tail end, the latter being of small area.

Press-fitted or otherwise rigidly mounted in the head 2 at its axis is a stud 3 which projects into a socket 4 axially extending in the body 1 from its front end. Within the socket 4, a spring 5 coiled on the stud 3 is compressed between a head 6 on the rear end of said stud and a metal disk 7 covering the front end of the body 1 and secured to the latter by screws 8. Thus said spring acts on the stud 3, which passes freely through the disk 7, to hold the head 2 yieldably pressed against the disk. Transversely mounted in the body 1, diametrical thereto, is a pin 9, the mid portion of which traverses the socket 4 and is normally received within a groove 10 diametrically formed in the stud head 6, thus locking the head and body of the lure against relative rotation. When, however, said head and body are pulled slightly apart, as illustrated in Fig. 5, this disengages the pin 9 from the groove 10, permitting rotation of the head 2. To safeguard the stud 3 against any rotation or sliding in the head 2, it is preferred to diametrically mount a pin 11 in said head, the stud being transversely drilled to receive such pin.

The particular shape of the inclined front face of the described lure is of importance in deriving a desired novel response of the lure to water pressure acting on such face. Thus said face is dished or concaved throughout approximately its entire area, the margin of said face, however, defining a plane inclined to the lure axis. The main concavity thus formed is subdivided by a shallow rib 12 into duplicate minor concavities 13, said rib bisecting the inclined face and coinciding in direction with its inclination. Said rib is arcuately depressed below the plane determined by the margin of the concave front face.

To the described lure, there may be attached any desired number of hooks carried in any desired manner by the lure. As illustrated, a multiple hook 14 is pivoted on the tail end of the body 1, and a similar hook 15 is pivoted on and beneath said body. It is preferred to extend the pin 9 to the bottom face of the body 1 and form it with an eyelet serving to carry the hook 15. An eyelet 16 or some other suitable anchorage for a fish line is carried by the head 2, preferably on its inclined front face.

In use of the described lure, the head 2 is adjusted as per Fig. 1, if it is desired to draw the lure along the surface of water. With the head so adjusted, the lure may be accelerated in its travel, if desired, to cause it to skip or bounce along the surface. To effect a submerged travel of the lure, the head 2 is adjusted as per Fig. 2, and the degree of submergence will depend on the speed at which the lure is drawn forward. The duplicate concavities 13 in the front end, both comprised by a larger concavity, secure for the lure a lively lateral wabbling movement as it is drawn through the water. Experiment has shown that the same effect may not be derived from a plane face inclined to the lure axis, or from such a face as fashioned to form a single concavity, nor from two plane faces inclined to the lure axis and meeting in V form.

It is to be noted that the lure shown in Fig. 5 is modified slightly from the construction so far described in that the head of the stud 6 is formed with two relatively transverse grooves 10', either of which may receive the pin 9. This permits of disposing the head 2 with its inclined front face disposed laterally, if desired, so as to impart a considerable back and forth side travel to the lure in its progress through water.

What I claim is:

1. An artificial lure comprising a body-forming member, a head-forming member having a front face diagonally inclined to the axis of the lure, a stud disposed substantially at said axis and fixed in one of said members, the other member having a socket receiving said stud, a spring coiled on said stud and yieldably maintaining an abutting relation of said members, and an element rigidly carried by the socket-forming member and normally coacting with the stud to resist relative rotation of the two members, and disengageable from the stud by a separative actuation of said members.

2. An artificial lure as set forth in claim 1, said spring being disposed in said socket.

3. An artificial lure as set forth in claim 1, said stud being fixed in said head-forming member and said socket being formed in the body-forming member.

4. An artificial lure as set forth in claim 1, the stud having a transversely grooved end within said socket, and said element normally resisting relative rotation of the two members being a pin extended in the socket-forming member transversely through the socket, and normally received in the groove of the stud.

5. In an artificial lure as set forth in claim 1, said spring being under compression, an abutment for the spring secured to that face of the socket-forming member into which the socket opens.

6. An artificial lure as set forth in claim 1, said element extending to an exterior face of the socket-forming member and having provision for supporting a fish hook.

EARL E. WILSON.

REFERENCES CITED

The following references are of record in the file of this patent:

UNITED STATES PATENTS

| Number | Name | Date |
|---|---|---|
| 1,254,397 | Dickens | Jan. 22, 1918 |
| 1,842,591 | Dunkelberger | Jan. 26, 1932 |
| 2,289,265 | Heddon | July 7, 1942 |
| 2,357,472 | Jenkins | Sept. 5, 1944 |